(12) United States Patent
Yang et al.

(10) Patent No.: US 9,997,064 B2
(45) Date of Patent: Jun. 12, 2018

(54) DISPLAY APPARATUS AND METHOD FOR CONTROLLING DISPLAY APPARATUS

(71) Applicant: SAMSUNG ELECTRONICS CO., LTD., Suwon-si, Gyeonggi-do (KR)

(72) Inventors: Geun-sam Yang, Suwon-si (KR); Seung-bok Lee, Hwaseong-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days. days.

(21) Appl. No.: 15/285,791

(22) Filed: Oct. 5, 2016

(65) Prior Publication Data

US 2017/0110005 A1    Apr. 20, 2017

(30) Foreign Application Priority Data

Oct. 19, 2015 (KR) .................. 10-2015-0145519

(51) Int. Cl.
| | |
|---|---|
| *G08C 17/02* | (2006.01) |
| *H04N 21/422* | (2011.01) |
| *H04N 5/44* | (2011.01) |
| *H04N 5/63* | (2006.01) |

(52) U.S. Cl.
CPC ........... *G08C 17/02* (2013.01); *H04N 5/4403* (2013.01); *H04N 5/63* (2013.01); *H04N 21/42207* (2013.01); *H04N 21/42221* (2013.01); *G08C 2201/51* (2013.01); *H04N 2005/4407* (2013.01); *H04N 2005/4426* (2013.01)

(58) Field of Classification Search
CPC .. G08C 17/02; G08C 2201/51; H04N 5/4403; H04N 5/63; H04N 21/42207; H04N 21/42221; H04N 2005/4407; H04N 2005/4426

USPC ....................................................... 340/12.23
See application file for complete search history.

(56) References Cited

U.S. PATENT DOCUMENTS

| | | | |
|---|---|---|---|
| 4,989,081 A * | 1/1991 | Miyagawa | H04L 12/2803 340/12.53 |
| 8,737,917 B2 | 5/2014 | Desai et al. | |
| 8,792,945 B2 | 7/2014 | Russell et al. | |
| 2002/0193073 A1* | 12/2002 | Fujioka | H04W 76/066 455/41.1 |
| 2004/0109441 A1 | 6/2004 | Hur et al. | |

(Continued)

FOREIGN PATENT DOCUMENTS

| | | |
|---|---|---|
| JP | 2001-223760 | 8/2001 |
| KR | 10-0537637 | 12/2005 |

(Continued)

OTHER PUBLICATIONS

Search Report and Written Opinion dated Jan. 10, 2017 in counterpart International Patent Application No. PCT/PCT/KR2016/011152.

*Primary Examiner* — Edwin Holloway, III
(74) *Attorney, Agent, or Firm* — Nixon & Vanderhye, P.C.

(57) ABSTRACT

A display apparatus and a method for controlling a display apparatus are provided. For example, a display apparatus which has an HCI type dual mode Bluetooth processor, and a method for controlling a display apparatus are provided. Example embodiments disclose a display apparatus which, in a standby mode in which a screen is turned off, controls the screen of the display apparatus having an HCI type dual mode Bluetooth processor, and a method for controlling a display apparatus.

15 Claims, 10 Drawing Sheets

(56) References Cited

U.S. PATENT DOCUMENTS

| | | | | |
|---|---|---|---|---|
| 2006/0227252 A1* | 10/2006 | Fratti | ................. | H04N 21/8106 |
| | | | | 348/738 |
| 2007/0066338 A1* | 3/2007 | Lee | .................... | H04L 12/2803 |
| | | | | 455/522 |
| 2013/0113710 A1 | 5/2013 | Choi et al. | | |
| 2014/0118624 A1* | 5/2014 | Jang | ......................... | H04N 5/63 |
| | | | | 348/730 |
| 2014/0191853 A1* | 7/2014 | Chen | ..................... | G08C 17/02 |
| | | | | 340/12.5 |
| 2014/0198253 A1 | 7/2014 | Kim et al. | | |
| 2015/0015380 A1 | 1/2015 | Choi et al. | | |
| 2015/0194087 A1 | 7/2015 | Choi | | |
| 2016/0360345 A1 | 12/2016 | Kim et al. | | |
| 2017/0026700 A1* | 1/2017 | Choi | ................... | H04N 21/4432 |
| 2017/0078610 A1* | 3/2017 | Yang | ....................... | H04N 5/63 |
| 2017/0180918 A1* | 6/2017 | Yang | .................... | H04W 4/008 |

FOREIGN PATENT DOCUMENTS

| | | |
|---|---|---|
| KR | 10-1061940 | 9/2011 |
| KR | 10-2013-0051153 | 5/2013 |
| KR | 10-2015-0082066 | 1/2015 |
| KR | 10-2015-0007954 | 7/2015 |
| WO | 2015-069030 | 5/2015 |

\* cited by examiner

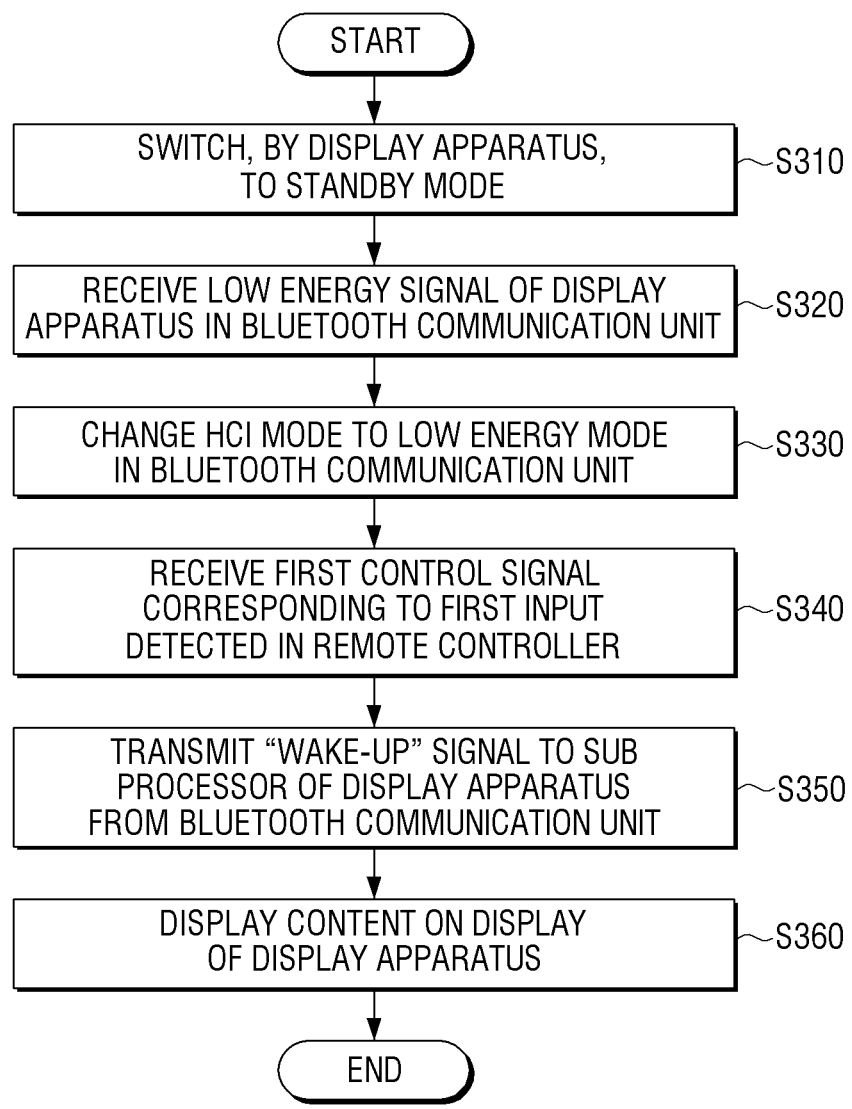

DISPLAY APPARATUS AND METHOD FOR CONTROLLING DISPLAY APPARATUS

CROSS-REFERENCE TO RELATED APPLICATIONS

This application is based on and claims priority under 35 U.S.C. § 119 to Korean Patent Application No. 10-2015-0145519, filed on Oct. 19, 2015, in the Korean Intellectual Property Office, the disclosure of which is incorporated by reference herein in its entirety.

BACKGROUND

Field

Apparatuses and methods of the disclosure relate generally to a display apparatus and a method for controlling a display apparatus, and for example, to a display apparatus which has a dual mode Bluetooth processor and a method for controlling a display apparatus.

Description of Related Art

As an interface between a display apparatus and a user, a panel key (or a function key) of the display apparatus or a remote controller are frequently used. With the development of technology, the functions of the display apparatus have become complicated (for example, executing various applications, playing games, or the like) and diversified, so that the display apparatus can execute a content such as a video which is downloaded from the outside and also can perform Internet browsing.

The remote controller is able to control the display apparatus using optical signals, and in recent years, remote controllers employing Bluetooth communication are increasingly used. The remote controller is able to control the display apparatus using Bluetooth communication and optical signals. The remote controller can offset the directional characteristic of the optical signals by the non-directional characteristic of the Bluetooth communication.

SUMMARY

One or more example embodiments may address the above disadvantages and other disadvantages not described above.

According to an aspect of an example embodiment, a display apparatus is provided including: a display; Bluetooth communication circuitry which includes a Bluetooth processor and selectively operates in one of a Host Controller Interface (HCI) mode and a low power mode; and a controller configured to control the display and the Bluetooth communication circuitry. In a normal mode in which the display is turned on, the controller may be configured to control the Bluetooth communication circuitry to operate in the HCI mode, and, in a standby mode in which the display is turned off, the controller may be configured to control the Bluetooth communication circuitry to operate in the low power mode.

The display apparatus may further include a power supply, and the controller may be configured to control the power supply to supply power to the Bluetooth communication circuitry in the standby mode.

According to an aspect of another example embodiment, a method of controlling a display apparatus which selectively operates in one of an HCI mode and a low power mode is provided, the method including: operating Bluetooth communication circuitry of the display apparatus, in a normal mode in which the display of the display apparatus is turned on, in the HCI mode; operating the Bluetooth communication circuitry in a standby mode in which the display is turned off in the low power mode; and, in response to control information received from a remote controller by the Bluetooth communication circuitry, switching the display apparatus from the standby mode to the normal mode.

According to an aspect of another example embodiment, a method of controlling a display apparatus is provided, including: switching from an HCI mode of a Bluetooth communication circuitry corresponding to a normal mode in which a display is turned on to a low power mode corresponding to a standby mode in which the display is turned off in response to a display apparatus being turned off; receiving, by the Bluetooth communication circuitry, control information from an external remote controller; switching the display apparatus from the standby mode to the normal mode in response to the control information being received; and displaying a content on the display in response to the switching to the normal mode.

According to an aspect of another example embodiment, a method of controlling a display apparatus is provided, the method including: in a normal mode in which a display of the display apparatus is turned on, operating, by Bluetooth communication circuitry of the display apparatus, in an HCI mode; and, in response to switching to a standby mode in which the display is turned off, switching, by the Bluetooth communication circuitry, from the HCI mode to a low power mode.

One or more example embodiments provide a display apparatus which has an HCI type dual mode Bluetooth processor which operates in the display apparatus in a standby mode, and a method for controlling a display apparatus.

One or more example embodiments provide a display apparatus having a dual mode Bluetooth processor which operates in a standby mode, and a method for controlling a display apparatus.

One or more example embodiments provide a display apparatus which has an HCI type dual mode Bluetooth processor which operates in a low power mode in response to the display apparatus being in a standby mode, and a method for controlling a display apparatus.

One or more example embodiments provide a display apparatus which can reduce power consumption by an HCI type dual mode Bluetooth processor which operates in an HCI mode and a low power mode, and a method for controlling a display apparatus.

One or more example embodiments provide a display apparatus which has an HCI type dual mode Bluetooth processor, and a method for controlling a display apparatus.

Additional and/or other aspects and advantages of the disclosure will be set forth in part in the description which follows and, in part, will be apparent from the description.

BRIEF DESCRIPTION OF THE DRAWINGS

The above and/or other aspects of the present disclosure will be more apparent from the following detailed description, taken in conjunction with the accompanying drawings, in which like reference numerals refer to like elements, and wherein:

FIG. 3 is a flowchart illustrating an example display control method of the display apparatus according to an example embodiment;

DETAILED DESCRIPTION

Figure 1:
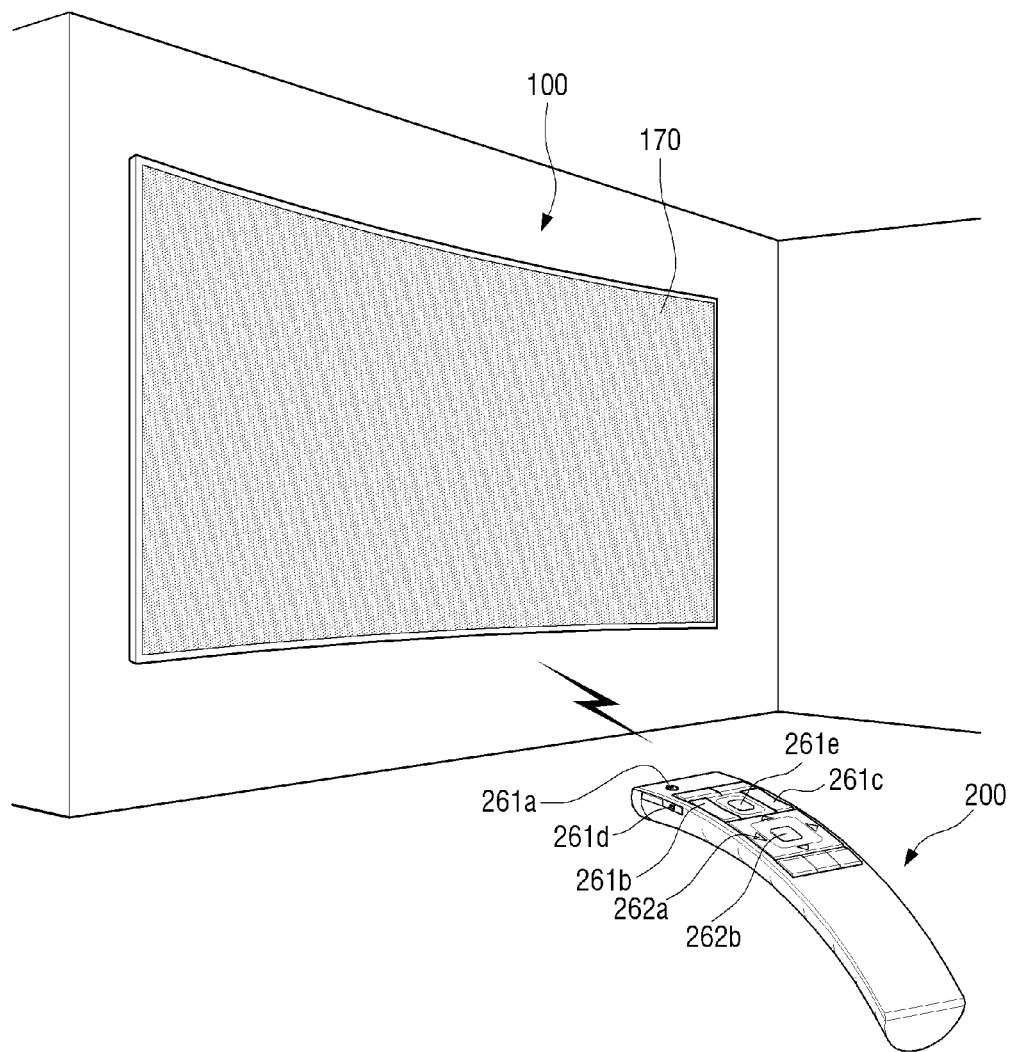
FIG. 1 is a diagram illustrating an example operation between a display apparatus and a remote controller according to an example embodiment.

Example embodiments of the present disclosure will be described below with reference to the accompanying drawings. A method for controlling an electronic device and the electronic device according to example embodiment will be described in greater detail below with reference to the accompanying drawings. In the explanation of the drawings, the same reference numerals or signs may be used to indicate components or elements performing the substantially same functions.

The term such as "first" and "second" used in various example embodiments may be used to explain various elements, but does not limit the corresponding elements. These terms may be used for the purpose of distinguishing one element from another element. For example, a first element may be named a second element without departing from the scope of right of various example embodiments of the disclosure, and similarly, a second element may be named a first element. The term "and/or" includes a combination of a plurality of relevant items or any one of the plurality of relevant items.

In example embodiments, the term "selecting a button (or a key)" provided on a remote controller 200 (see FIG. 1) may refer, for example, to "pressing a button (or a key)" or "touching a button (or a key)." In addition, the term "user input" may, for example, be used as a term including user's selecting a button (or a key), user's pressing a button (or a key), user's touching a button, a user's touch gesture, a user's voice, user's presence (for example, a user appearing within a camera recognition rage), or a user's motion.

In various example embodiments, a touch (including a touch gesture) on the remote controller 200 may be input by a user's body or an input pen (not shown) (for example, a stylus pen).

In example embodiments, a screen of a display apparatus may refer, for example, to a display of the display apparatus.

In example embodiments, the term "power off of the screen of the display apparatus" may be used to indicate the same meaning as the power off of the display apparatus. In response to the screen of the display apparatus being turned off, the plug of the power cable of the display apparatus may be connected to a power outlet.

The terms used in various example embodiments of the present disclosure are used to explain example embodiments and are not intended to restrict and/or limit the present disclosure. As used herein, the singular forms are intended to include the plural forms as well, unless the context clearly indicates otherwise. The terms "include", "have," etc. used in the description of example embodiments of the present disclosure indicate the presence of features, numbers, steps, operations, elements, parts set forth in the specification, or a combination thereof, and do not preclude the presence or addition of one or more other features, numbers, steps, operations, elements, parts, or a combination thereof.

The same reference numerals in the drawings indicate elements performing the substantially same functions.

FIG. 1 is a diagram illustrating an example operation between a remote controller and a display apparatus according to an example embodiment.

Referring to FIG. 1, the display apparatus and the remote controller are illustrated.

The display apparatus 100 receives a control command through short-distance communication (for example, Bluetooth, Bluetooth low energy, or the like) under the control of the remote controller 200. In addition, the display apparatus 100 may receive the control command from the remote controller 200 through infrared communication.

A user may input various commands by selecting a button (including a key) provided on the remote controller 200 or through various interactions methods (for example, using a touch pad, voice recognition through a microphone, or motion recognition through a sensor). The display apparatus 100 may be controlled in response to a received user command (for example, power on/off, booting, channel change, volume adjustment, content reproduction, or the like). For example, when the screen of the display apparatus 100 is turned off, the user may turn on the screen of the display apparatus 100 using the remote controller 200.

The user may input a motion using a camera 145 (see FIG. 2) which may be separate from the remote controller 200 and may be attached to the display apparatus 100 or may be implemented separately from the display apparatus 100. The display apparatus 100 may recognize a user's motion photographed through the camera, and perform an operation (for example, power on/off, booting, channel change, volume adjustment, content reproduction, or the like) based on the result of the recognition.

The display apparatus 100 may detect user's presence using the camera 145. For example, the activated camera 145 may detect user's presence in the display apparatus 100 having the screen turned off.

The remote controller 200 includes buttons 261 (or keys) corresponding to the functions and/or operations of the display apparatus 100. The buttons 261 include physical buttons or touch buttons. In addition, the remote controller 200 may include single function buttons (for example, 261a to 262b) and/or multi function buttons (not shown) corresponding to the functions performed in the display apparatus 100.

The single function buttons (for example, 261a to 262b) including a power buttoner 261a of the remote controller 200 may be used as a term indicating a button corresponding to control of one of the plurality of functions performed in the display apparatus 100.

The multi function buttons (for example, a color button (not shown)) of the remote controller 200 may be used as a term indicating a button corresponding to control of an additional function which is provided (or set) differently based on a function performed in the display apparatus 100. The multi function buttons may be displayed in colors (for example, red, yellow, green, or the like) different from the other buttons. The number of multi function buttons may be increased, changed, or reduced according to the functions of the display apparatus 100.

Figure 2A:
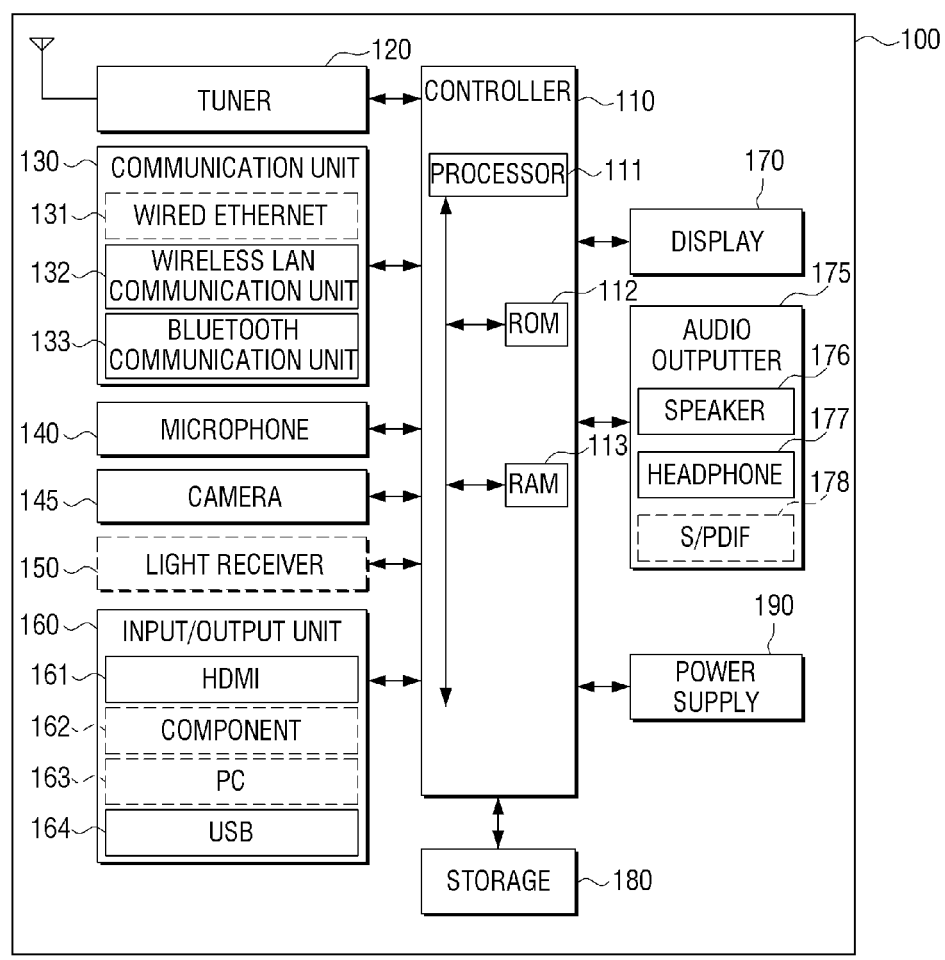
FIGS. 2A and 2B are block diagrams an example display apparatus and an example remote controller according to an example embodiment.
Figure 2B:
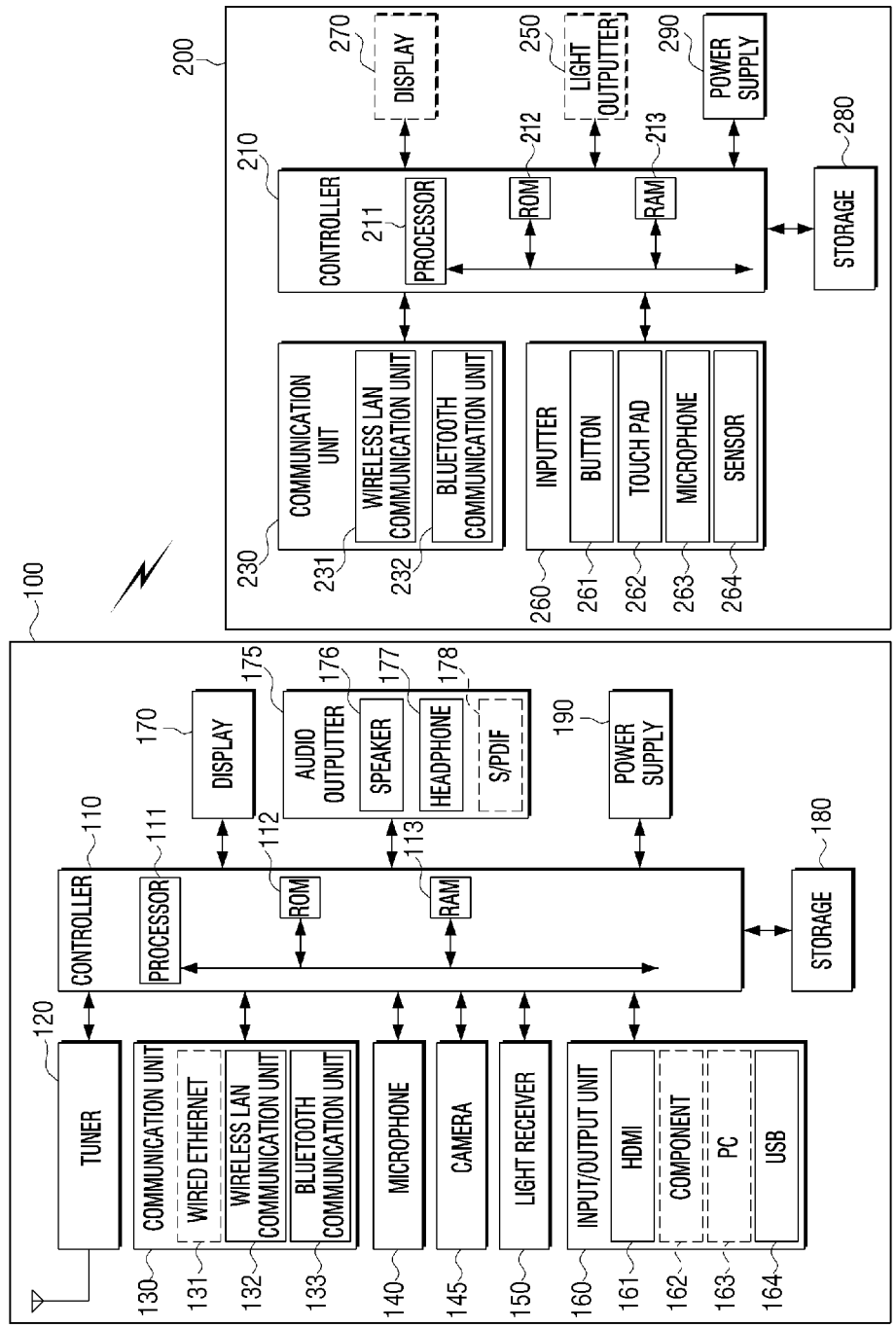

FIGS. 2A and 2B are block diagrams illustrating an example display apparatus and the remote controller according to an example embodiment.

Referring to FIGS. 2A and 2B, the display apparatus 100 may receive control information transmitted from the remote controller 200. The display apparatus 100 may be connected with an external electronic device (not shown) through a communication unit (e.g., including communication circuitry) 130 and/or an input/output unit (e.g., including input/output circuitry) 160 in a wired or wireless manner. The external electronic device may include a mobile phone (not shown), a smart phone (not shown), a tablet PC (not shown), a PC (not shown), and a server (not shown), or the like, but is not limited thereto.

The display apparatus 100 may include a display 170 and may additionally include at least one of a tuner 120, the communication unit 130, and the input/output unit 160. Referring to FIG. 2A, the display apparatus including all of the above-described elements is illustrated. In addition, the tuner 120 may be implemented as a separate device (for example, a set-top box or the like (not shown)) from the display apparatus 100 having the display 170. In this example, the display apparatus 100 may be electrically connected with the separate device to receive signals.

For example, the display apparatus 100 may be implemented using an analogue TV, a digital TV, a 3D-TV, a smart TV, a Light Emitting Diode (LED) TV, an Organic LED (OLED) TV, a plasma TV, a monitor, a curved TV which has a screen of a fixed curvature, a flexible TV which has a screen of a fixed curvature, a bended TV which has a screen of a fixed curvature, and/or a curvature variable TV which is able to change a curvature of a current screen according to a user input, a monitor, a PC, a laptop PC, a tablet PC, a mobile phone, a kiosk, a video wall system, an electronic display board, or the like. However, it should be understood by a person skilled in the art that the present disclosure is not limited to these.

The display apparatus 100 includes the tuner 120, the communication unit 130, a microphone 140, the camera 145, a light receiver 150, the input/output unit 160, the display 170, an audio outputter (e.g., including audio output circuitry) 175, a storage 180, and a power supply 190. The display apparatus 100 may include a sensor (for example, an illuminance sensor, a temperature sensor, or the like (not shown)) to detect an internal state or an external state of the display apparatus 100.

A controller 110 includes a processor 111. In addition, the controller 110 may further include a Read Only Memory (ROM) 112 (a non-volatile memory) which stores a control program to control the display apparatus 100, and a Random Access Memory (RAM) 113 (or a volatile memory) which stores signals or data inputted from the outside of the display apparatus 100 or is used as a storage area corresponding to various jobs performed in the display apparatus 100.

The controller 110 may control an overall operation of the display apparatus 100 and a signal flow between the inner elements 110-190 of the display apparatus 100, and may process data. The controller 110 controls power supplied to the inner elements 110-190 from the power supply 190.

The processor 111 may include a graphic processing unit (GPU) (not shown) to process graphics corresponding to an image or a video. The processor 111 may be implemented by using a System On Chip (SoC) including a core (not shown) and a GPU. In addition, the processor 111 may be implemented by using a SoC including at least one of the ROM 112 and the RAM 113. The processor 111 may include a single core, a dual core, a triple core, a quad core, and core of a multiple thereof.

The processor 111 may include a plurality of processors. The plurality of processors may include a main processor (not shown) which operates in a pre-power on mode (a mode between a standby mode and a normal mode) for preparing the operation of the display apparatus 100, which is one of the states of the display apparatus 100, or a normal mode for displaying a broadcast screen, and a sub processor (not shown) which operates in a standby mode (for example, in this mode, the power of the display apparatus is turned off and a power plug is connected to a power outlet), which is one of the states of the display apparatus 100. In the pre-power on mode, the display apparatus 100 may be activated and perform a pre-operation to display various contents.

The controller 110 including the main processor may operate in the pre-power on mode and/or the normal mode. In addition, the controller 110 including the sub processor may operate in the standby mode.

The plurality of processors may further include a sensor processor (not shown) to control sensors (not shown). The processor 111, the ROM 112, and the RAM 113 may be connected with one another through an internal bus.

The controller 110 may control the display 170 and a Bluetooth communication unit 133.

The controller 110 may control the display 170 and the Bluetooth communication unit 133 which selectively operates in one of a Host Controller Interface (HCI) mode and a low power mode, and the controller 110 may control the Bluetooth communication unit 133 to operate in the HCI mode in the normal mode in which the display 170 is turned on, and control the Bluetooth communication unit to operate in the low power mode in the standby mode in which the display 170 is turned off.

The display apparatus 100 may further include a power supply 190, and the controller 110 may control the power supply 190 to supply power to the Bluetooth communication unit 133 in the standby mode.

In the normal mode in which the display 170 is turned on, the controller 110 may execute a Bluetooth stack and control to interwork with the dual mode Bluetooth processor of the Bluetooth communication unit 133 through the HCI of the Bluetooth communication unit 133.

The controller 110 may control the Bluetooth communication unit 133 to operate independently from the controller 110 in the low power mode.

The controller 110 may include the main processor and the sub processor, and may control the sub processor to communicate with the Bluetooth communication unit 133 in the low power mode.

The controller 110 including the sub processor may receive a wake-up signal corresponding to the reception of the control information from the Bluetooth communication unit 133.

The controller 110 may control the display apparatus 100 to switch to the normal mode in response to the wake-up signal.

The controller 110 may control to reproduce a content on the display 170 in response to switching to the normal mode.

According to an example embodiment, the term "controller of the display apparatus 100" may include, for example, the processor 111, the ROM 112, and the RAM 113 of the display apparatus 100.

In addition, the above-described controller is illustrated and described as including the processor 111, the ROM 112, and the RAM 113 of the display apparatus 100, but this should not be considered as limiting. For example, the term "controller of the display apparatus 100" may be used to refer to an arrangement in which the controller includes the main processor, the sub processor, the ROM 112, and the RAM 113 of the display apparatus 100. In addition, the term "controller of the display apparatus 100" may be used to refer to an arrangement in which the controller includes the sub processor, the ROM 112, and the RAM 112 of the display apparatus 100. In addition, the term "controller of the display apparatus 100" may be used to refer to an arrangement in which the controller includes the main processor, the sub processor, the sensor processor, the ROM 112, and the RAM 113 of the display apparatus 100. In addition, the controller may be implemented by using a SoC or an Integrated Circuit (IC) logic.

It would be easily understood by a person skilled in the art that the configuration and the operation of the controller 110 may be implemented variously according to an example embodiment.

The tuner 120 may select broadcast signals received from the outside through a wire or wirelessly by tuning to only a frequency of a channel that the display apparatus 100 wishes to receive from among various radio wave components through amplification, mixing, resonance, or the like. The broadcast signals include a video, an audio, and additional data (for example, Electronic Program Guide (EPG)).

The tuner 120 may receive a video, an audio, and additional data in a frequency band corresponding to a channel number (for example, cable broadcast channel number 506) corresponding to a user input.

The tuner 120 may receive broadcast signals from various sources such as a terrestrial broadcast, a cable broadcast, a satellite broadcast, or the like. The tuner 120 may receive broadcast signals from sources such as an analogue broadcast, a digital broadcast, or the like.

The tuner 120 may be implemented in an all-in-one type with the display apparatus 100 or may be implemented by using a separate device having a tuner unit electrically connected with the display apparatus 100 (for example, a set-top box (not shown) or a tuner (not shown) connected to the input/output unit 160).

The communication unit 130 may include various communication circuitry to connect the display apparatus 100 to the remote controller 200 or an external electronic device (not shown) under the control of the controller 110. In addition, the communication unit 130 may receive control information corresponding to control of the display apparatus 100 transmitted from the remote controller 200 under the control of the controller 110.

The communication unit 130 may include various communication circuitry, such as, for example, and without limitation, at least one of wired Ethernet 131, a wireless local area network (LAN) communication unit 132, and the Bluetooth communication unit (e.g., including Bluetooth communication circuitry) 133 according to performance and configuration of the display apparatus 100. In addition, the communication unit 130 may include a combination of communication circuitry, including the wired Ethernet 131, the wireless LAN communication unit 132, and the Bluetooth communication unit 133. The Bluetooth communication is one of the short-distance communication methods implemented by various Bluetooth circuitry, and may include Bluetooth low energy (BLE), Ultra-Wideband (UWB), or Near Field Communication (NFC), or the like.

The Bluetooth communication unit 133 includes Bluetooth circutiry configured to perform Bluetooth communication with the remote controller 200. The Bluetooth communication unit 133 may receive control information from the remote controller 200. The Bluetooth communication unit 133 may include various Bluetooth communication circuitry, such as, for example, and without limitation, a Bluetooth processor (which may be referred to as a Bluetooth chip (not shown)). The Bluetooth communication unit 133 may include Bluetooth communication circuitry including the Bluetooth processor and a first storage (for example, a ROM (not shown) including an EEPROM) which stores a Bluetooth profile.

The Bluetooth communication unit 133 may include Bluetooth communication circuitry including the Bluetooth processor, the first storage, and an antenna (not shown). In addition, the Bluetooth communication unit 133 may include Bluetooth communication circuitry including the Bluetooth processor, the first storage (not shown), the antenna, and a filter (not shown) to filter noise of signals received through the antenna.

The Bluetooth processor may be a dual mode Bluetooth processor which supports Bluetooth classic which is a previous version of Bluetooth 4.0, and Bluetooth low energy which is a next version of Bluetooth 4.0. The dual mode Bluetooth processor may refer, for example, to a process which selectively operates in one of the two modes. For example, the dual mode Bluetooth processor may operate in a Host Controller Interface (HCI) mode or a low-power mode.

In response to the display apparatus 100 being in the normal mode, the Bluetooth processor may be an HCI type dual mode Bluetooth processor which can communicate with the controller 110 of the display apparatus 100. For example, the HCI type dual mode Bluetooth processor may communicate with a Bluetooth stack (not shown) which is software for controlling the HCI type dual mode Bluetooth processor of the display apparatus 100 through the HCI.

The HCI type dual mode Bluetooth processor may communicate with the Bluetooth stack which is software for controlling the HCI type dual mode Bluetooth processor in the display apparatus 100 under the control of the controller 110 through the HCI. The HCI type dual mode Bluetooth processor may operate through the communication with the Bluetooth stack. The Bluetooth stack may be executed by the controller 110. In the normal mode in which the display 170 is turned on, the controller 110 may execute the Bluetooth stack to interwork with the dual mode Bluetooth processor through the HCI of the Bluetooth communication unit 133.

In response to the display apparatus 100 being in the standby mode, the HCI type dual mode Bluetooth processor may not communicate with the controller 110 of the display apparatus 100. The HCI type dual mode Bluetooth processor may not communicate with the Bluetooth stack which is software for controlling the HCI type dual mode Bluetooth processor in the display apparatus 100 under the control of the controller 110 through the HCI. In response to the HCI type dual mode Bluetooth processor not communicating with the Bluetooth stack, the HCI type dual mode Bluetooth processor may be inactivated.

According to an example embodiment, the Bluetooth communication unit 133 may include Bluetooth circuitry including a switching module (not shown). In addition, the HCI type dual mode Bluetooth processor may further include a switching module. The switching module may include circuitry configured to switch between an HCI mode which corresponds to the display apparatus 100 in the normal mode, and a low energy mode which corresponds to the display apparatus 100 in the standby mode.

The HCI mode is a mode in which the HCI type dual mode Bluetooth processor of the Bluetooth communication unit 133 operates with the Bluetooth stack of the display apparatus 100 in the normal mode. In addition, the low energy mode is a mode in which the HCI type dual mode Bluetooth processor of the Bluetooth communication unit 133 operates to standalone in the standby mode. The HCI type dual mode Bluetooth processor in the low energy mode may operate independently from the Bluetooth stack of the display apparatus 100.

The HCI type dual mode Bluetooth processor may operate in the HCI mode which corresponds to the display apparatus 100 in the normal mode, and the low energy mode which corresponds to the display apparatus 100 in the standby mode.

The switching module of the Bluetooth communication unit 133 may switch between the HCI mode which corresponds to the display apparatus 100 in the normal mode, and the low energy mode which corresponds to the display apparatus 100 in the standby mode under the control of the controller 110. Alternatively, the switching module of the Bluetooth communication unit 133 may switch between the HCI mode which corresponds to the display apparatus 100 in the normal mode, and the low energy mode which corresponds to the display apparatus 100 in the standby mode under the control of the HCI type dual mode Bluetooth processor.

According to another example embodiment, without the switching module of the Bluetooth communication unit 133, the HCI type dual mode Bluetooth processor may operate in the HCI mode which corresponds to the display apparatus 100 in the normal mode, or may operate in the low energy mode which corresponds to the display apparatus 100 which switches from the normal mode to the standby mode.

In the low energy mode, the HCI type dual mode Bluetooth processor may perform Bluetooth communication with an external device using a light profile (for example, a light profile for Bluetooth classic or a light profile for Bluetooth low energy (not shown)), which is separate from a profile (for example, a profile for Bluetooth classic and/or a profile for Bluetooth low energy) which is used in the normal mode.

In the dual mode Bluetooth processor, the profile used in the normal mode may be different from the profile used in the standby mode. The separate light profile (not shown) may be stored in the first storage (not shown) of the Bluetooth communication unit 133.

The switching module may be implemented using software or hardware. In addition, the switching module may be implemented by a combination of software and hardware.

The HCI type dual mode Bluetooth processor may communicate with the controller 110 of the display apparatus 100 in the standby mode. In addition, according to an example embodiment, the Bluetooth processor may be the HCI type dual mode Bluetooth processor which can communicate with the controller 110 of the display apparatus 100 in the pre-power on mode.

According to an example embodiment, the Bluetooth communication unit 133 may receive control information transmitted from the remote controller 200 under the control of the controller 110.

The Bluetooth communication unit 133 may receive a packet which follows the Bluetooth low energy standard and includes control information (for example, a power on/off command, channel change, volume adjustment, or the like) transmitted from the remote controller 200. Hereinafter, the packet following the Bluetooth low energy standard will be referred to as a "BLE packet" for the convenience of explanation. In addition, the Bluetooth communication unit 133 may receive a packet including the control information transmitted from the remote controller 200 and following the Bluetooth classic standard. Hereinafter, the packet following the Bluetooth classic standard will be referred to as a "classic packet" for convenience of explanation. A packet including the BLE packet and the classic packet may be referred to as a Bluetooth packet.

An amount of power consumed by the Bluetooth communication unit 133 is different based on the normal mode or the standby mode which indicates one of the states of the display apparatus 100. For example, the Bluetooth communication unit 133 in the HCI mode corresponding to the display apparatus 100 in the normal mode may consume 100 mW. In addition, the Bluetooth communication unit 133 in the low energy mode corresponding to the display apparatus 100 in the standby mode may consume 12.5 mW.

The microphone 140 receives a voice uttered by the user. The microphone 140 may convert the received voice into an electrical signal and output the electrical signal to the controller 110. For example, the user voice may include a voice corresponding to control of a function or a menu of the display apparatus 100. The recognition range of the microphone 140 may depend on the level of a user's voice and a surrounding environment (for example, a speaker sound, ambient noise, or the like).

The microphone 140 may be implemented in an all-in-one type with the display apparatus 100, or may be separated from the display apparatus 100 as a separate device. The separated microphone 140 may be electrically connected with the display apparatus 100 through the communication unit 130 or the input/output unit 160.

The camera 145 may make a video (for example, continuous frames) in a camera recognition range. The video may be used to recognize a user's motion. For example, the user motion may include the presence of the user (for example, the user appears within the camera recognition range), a part of the user's body such as user's face, look, hand, fist, or finger, or a motion of a part of the user's body.

The camera 145 may include a lens (not shown) and an image sensor (not shown). The camera 145 may support optical zoom or digital zoom using a plurality of lenses and image processing.

The camera 145 may be disposed, for example, on one of the upper end, the lower end, the left, and the right of the display apparatus 100. In addition, the camera 145 may be disposed on one of the center of the upper end, the right of the lower end, the center of the lower end, and the left of the lower end of the display apparatus 100.

According to an example embodiment, the camera 145 may photograph the user (or user's motion) in the display apparatus 100 which is turned off based on power supply of the power supply 190 (however, a power plug is connected to a power outlet). In addition, the camera 145 may photograph the user (or user's motion) in the display apparatus 100 which has the screen turned off (or in the standby mode, the plug of the power cable is connected to the power outlet) according to power supply of the power supply 190.

The camera 145 may convert the photographed motion into an electrical signal under the control of the controller 110, and transmit the electrical signal to the controller 110. The controller 110 may analyze the photographed motion image and recognize the user's motion. The controller 110 may display a menu on the display apparatus 100 or control according to the result of the motion recognition (for example, channel change or volume adjustment).

When a plurality of cameras 145 are provided, the display apparatus 100 may receive a 3D still image or a 3D motion using a first camera (not shown) disposed on the front surface of the display apparatus 100 and a second neighbor camera (not shown) (for example, a distance between the first camera (not shown) and the second camera (not shown) is greater than 5 mm and less than 80 mm).

The camera 145 may be implemented in an all-in-one type with the display apparatus 100 or may be separated from the display apparatus 100 as a separate device. An electronic device (not shown) including a separated camera may be electrically connected with the display apparatus 100 through the communication unit 130 or the input/output unit 160.

The light receiver 150 may include light receiving circuitry configured to receive a light signal (including control information) output from the remote controller 200 through a light window (not shown).

The light receiver 150 may receive a light signal corresponding to a user input (for example, a touch, pressing, a touch gesture, a voice, or a motion) from the remote controller 200. The control information may be extracted from the received light signal. The received light signal and/or the extracted light information may be transmitted to the controller 110.

Referring to FIG. 2A, both the light receiver 150 and the Bluetooth communication unit 133 are included. However, when the remote controller 200 transmits the control information to the display apparatus 100 through Bluetooth communication as described above, the light receiver 150 may be omitted.

The input/output unit 160 may include various input/output circuitry that receives a content from the outside of the display apparatus 100. For example, the content may include a video, an image, a text, or a web document, for example.

The input/output unit 160 may include various input/output circuitry, such as, for example, and without limitation, one or more of a High Definition Multimedia Interface (HDMI) port 161, a component input jack 162, a PC input port 163, and a USB input jack 164, which correspond to reception of the content. The input/output unit 160 may include a combination of the HDMI input port 162, the component input jack 162, the PC input port 163, and the USB input jack 164. It would be easily understood by a person skilled in the art that the input/output unit 160 may be added, deleted, and/or changed based on performance and configuration of the display apparatus 100.

The display 170 displays a video included in a broadcast signal received through the tuner 120 under the control of the controller 110. The display 170 may display a content (for example, a video) input through the communication unit 130 or the input/output unit 160. The display 170 may output a content stored in the storage 180 under the control of the controller 110. In addition, the display 170 may display a voice user interface (UI) to perform a voice recognition task corresponding to voice recognition, or a motion UI to perform a motion recognition task corresponding to motion recognition. For example, the voice UI may include a voice command guide and the motion UI may include a motion command guide.

According to an example embodiment, the screen of the display apparatus 100 may include the display 170 of the display apparatus 100.

In response to a content being displayed on the display 170, the display 170 may display visual feedback under the control of the controller 110.

According to another example embodiment, the display 170 may be separated from the display apparatus 100. The display 170 may be electrically connected with the display apparatus 100 through the input/output unit 160 of the display apparatus 100.

The audio outputter 175 may include various audio output circuitry that outputs an audio included in a broadcast signal received through the tuner 120 under the control of the controller 110. The audio outputter 175 may output an audio (for example, an audio corresponding to a voice or a sound) input through the communication unit 130 or the input/output unit 160. In addition, the audio outputter 175 may output an audio file stored in the storage 180 under the control of the controller 110.

The audio outputter 175 may include various audio output circuitry, such as, for example, and without limitation, at least one of a speaker 176, a headphone output terminal 177, or an S/PDIF output terminal 178. In addition, the audio outputter 175 may include a combination of the speaker 176, the headphone output terminal 177, and the S/PDIF output terminal 178.

According to an example embodiment, the audio outputter 175 may output auditory feedback in response to the display of a content on the display 170 under the control of the controller 110 of the display apparatus 100.

The storage 180 may store various data, programs, or applications for driving and controlling the display apparatus 100 under the control of the controller 110. The storage 180 may store signals or data which is inputted/outputted in response to the driving of the tuner 120, the communication unit 130, the microphone 140, the camera 145, the light receiver 150, the input/output unit 160, the display 170, the audio outputter 175, and the power supply 190.

The storage 180 may store a control program for controlling the display apparatus 100 and the controller 110, an application which is initially provided by a manufacturer or downloaded from the outside, a GUI related to an application, an object for providing a GUI (for example, an image, a text, an icon, a button, or the like), user information, documents, databases, or related data.

The storage 180 may include various program modules, including, for example, and without limitation, a broadcast reception module, a channel control module, a volume control module, a communication control module, a voice recognition module, a motion recognition module, a light reception module, a display control module, an audio control module, an external input control module, a power control module, a voice database (DB), or a motion database (DB), which are not illustrated. The modules and database of the storage, which are not illustrated, may be implemented in the form of software to perform a control function of broadcast reception in the display apparatus 100, a channel control function, a volume control function, a Bluetooth/Bluetooth low energy communication control function, a voice recognition function, a motion recognition function, a light reception control function, a display control function, an audio control function, an external input control function, or a power control (for example, a standby mode, a pre-power on mode, and/or a normal mode) function. The controller 110 may perform the function of the display apparatus 100 using the software stored in the storage 180.

The storage 180 may store display apparatus information or remote controller information.

The storage 180 may store control information received from the remote controller 200.

The storage 180 may store a wake-up signal received from the remote controller 200.

The storage 180 may store a video, an image, or a text corresponding to visual feedback.

The storage 180 may store a sound corresponding to auditory feedback.

The storage 180 may store a feedback providing time (for example, 300 ms) of feedback provided to the user.

The term "storage" used in the embodiments may refer, for example, to an arrangement in which the storage includes the storage 180, the ROM 112 of the controller 110, the RAM 113, a storage (not shown) which is implemented by using a SoC (not shown), a memory card (not shown) (for example, a micro SD card or a USB memory) which is mounted in the display apparatus 100, and an external storage (not shown) connectable to the port of the USB 164 of the input/output unit 160 (for example, a USB memory). In addition, the storage may include a non-volatile memory, a volatile memory, a hard disk drive (HDD), or a solid state drive (SSD).

The power supply 190 may supply power received from an external power source to the inner elements 110-190 of the display apparatus 100 under the control of the controller 110. The power supply 190 may supply power received from one or more batteries (not shown) located in the display apparatus 100 to the inner elements 110-190 under the control of the controller 110.

The power supply 190 may include a first power supply (not shown) to supply power to the communication unit 130 of the display apparatus 100 which is turned off (or which is in the standby mode of the display apparatus 100 or which has a power plug connected to a power outlet).

The power supply 190 may include a first power supply (not shown) to supply power to the short-distance communication unit 133 of the display apparatus 100 which is turned off (or which is in the standby mode of the display apparatus 100 or which has a power plug connected to a power outlet), and the sub processor (not shown) for controlling the short-distance communication unit 130. The power supply 190 may include a first power supply (not shown) to supply power to the camera 145 of the display apparatus 100 which is turned off (however, a power plug is connected to a power outlet), and the sensor processor (not shown) for controlling the camera 145.

The power supply 190 may include a battery (not shown) to supply power to the short-distance communication unit 133 of the display apparatus 100 which is turned off (however, a power plug is connected to a power outlet).

From among the elements 110-190 of the display apparatus 100 illustrated in FIGS. 1 and 2A, at least one element (for example, at least one of the elements illustrated by dashed boxes) may be added, changed, or deleted based on the performance and/or type of the display apparatus 100. In addition, it would be easily understood by a person skilled in the art that the locations of the elements 110-190 may be changed based on the performance or configuration of the display apparatus 100.

Referring to FIG. 2B, the remote controller 200 which remotely controls the display apparatus 100 may include a controller 210, a communication unit (e.g., including communication circuitry) 230, an inputter (e.g., including input circuitry) 260, a light outputter (e.g., including light output circuitry) 250, a display 270, a storage 280, and a power supply 290. The remote controller 200 may include the communication unit 230 or may include both the communication unit 230 and the light outputter 250.

The remote controller 200 may refer, for example, to a device which can control the display apparatus 100. In addition, the remote controller 220 may include a device in which an application (not shown) for controlling the display apparatus 100 can be installed (or can be downloaded from the outside). An electronic device in which an application (not shown) for controlling the display apparatus 100 can be installed may have a display (for example, a display having only a display panel without a touch screen or a touch panel).

The electronic device having the display may include a mobile phone (not shown), a smart phone (not shown), a tablet PC (not shown), a notebook PC (not shown), other display apparatuses (not shown), or a home appliance (for example, a refrigerator, a washing machine, or a cleaner), or the like, but is not limited thereto. The user may control the display apparatus 100 using a function button (not shown) (for example, a channel button) on a GUI (not shown) provided by the executed application.

The controller 210 may include a processor 211. The controller 210 may further include a ROM 212 (or a non-volatile memory) which stores a control program for controlling the remote controller 200, and a RAM 213 (or a volatile memory) which stores signals or data inputted from the outside of the remote controller 200 or is used as a storage area for various jobs performed in the remote controller 200.

The controller 210 controls an overall operation of the remote controller 200 and controls a signal flow between the inner elements 220 to 290, and processes data. The controller 210 may control power supply to the inner elements 220 to 290 using the power supply 290.

The controller 210 may control a power button 261a (illustrated in FIG. 1) to turn on the power of the display apparatus and the communication unit 230, and control to transmit control information corresponding to a user input to the display apparatus 100 the display 170 of which is turned off through the communication unit 230 according to selection of the power button 261a.

The controller 210 may be configured to transmit control information including one of a BLE packet which follows the Bluetooth low energy standard and a Bluetooth classic packet which follows the Bluetooth classic standard to the display apparatus 100 through the communication unit 230.

According to an example embodiment, the controller of the remote controller 200 may include the processor 211, the ROM 212, and the ROM 213 of the remote controller 200.

The communication unit 230 may be connected with the display apparatus 100 wirelessly under the control of the controller 210. The communication unit 230 may include various communication circuitry to transmit control information (for example, control information corresponding to power on or control information corresponding to a motion of the remote controller) corresponding to a user input (for example, a touch, pressing, a touch gesture, a voice, or a motion) to the display apparatus 100 under the control of the controller 210.

The communication unit 230 may include various communication circuitry, such as, for example, and without limitation, at least one of a wireless LAN communication unit 231 and a Bluetooth communication unit 232 or both of the wireless LAN communication unit 231 and the Bluetooth communication unit 232.

The wireless LAN communication unit 231 may be connected with an access point (AP) wirelessly in a place where the AP is installed under the control of the controller 210. The wireless LAN communication unit 231 may include WiFi, for example. The wireless LAN communication unit 231 may support the wireless LAN standards (IEEE802.11x) of the IEEE.

The Bluetooth communication unit 232 may include Bluetooth communication circuitry to perform short-distance communication between the remote controller 200 and the display apparatus 100 wirelessly without an AP under the control of the controller 210.

The Bluetooth communication unit 232 may include Bluetooth communication circuitry to transmit control information (for example, first control information) transmitted to the display apparatus 100 using a Bluetooth packet (for example, one of the Bluetooth classic packet and the Bluetooth low energy packet).

FIG. 2B illustrates the Bluetooth communication unit 232, but the short-distance communication may include infrared data association (IrDA), Ultra Wideband (UWB) communication, NFC, or the like.

The light outputter 250 may include light output circuitry configured to output a light signal (for example, including control information) corresponding to a user input (for example, a touch, pressing, a touch gesture, a voice, or motion) under the control of the controller 210. The outputted light signal may be received at the light receiver 150 of the display apparatus 100.

A remote control code format used in the remote controller 200 may be one of a manufacturer-dedicated remote control code format and a common use remote control code format. The remote control code format may include a leader code and a data word. The outputted light signal may be modulated by a carrier wave and output. The control information may be stored in the storage 280 or may be generated by the controller 210. The remote controller 200 may include an infrared laser emitting diode (IR-LED).

The remote controller 200 may include one or both of the communication unit 230 and the light outputter 250 which are able to transmit the control information.

The controller 210 may transmit control information corresponding to a user input and/or control information corresponding to a motion of the remote controller 200 to the display apparatus 100 through one of the communication unit 230 and the light outputter 250 (for example, the communication unit 230).

The inputter 260 may include various input circuitry, such as, for example, and without limitation, a button 261 or a touch pad 262 to receive a user input (for example, a touch or pressing) for controlling the display apparatus 100. The inputter 260 may include a microphone 263 to receive a uttered user voice which is one of the user inputs, a sensor 264 to detect a motion of the remote controller 200 which is made by another user input, or a vibration motor (not shown) to provide haptic feedback.

The inputter 260 may output an electrical signal (for example, an analog signal or digital signal) corresponding to a received user input (for example, a touch, pressing, a touch gesture, a voice, or a motion) to the controller 210.

The button 261 may include buttons 261a to 261e of FIG. 1. The touch pad 262 may receive a user's touch or a user's touch gesture.

The touch pad 262 may be implemented as a direction button 262a and an enter button 262b. In addition, the touch pad 262 may be formed on the front surface of the remote controller 200 where the buttons 261a to 261e are not disposed.

The microphone 263 receives a voice uttered by the user. The microphone 263 may convert the received voice into an electrical signal and output the electrical signal to the controller 210.

The sensor 264 may include various sensor circuitry to detect an internal state and/or external state of the remote controller 200. For example, the sensor 264 may include a motion sensor (not shown) to detect a motion of the remote controller 200, a gyro sensor (not shown) to detect a direction using rotational inertia of the remote controller 200, an acceleration sensor (not shown) to detect acceleration of 3 axes (for example, X-axis, Y-axis, Z-axis) applied to the remote controller 200, or a gravity sensor to detect the working direction of the gravity. The sensor 264 may measure acceleration or gravity acceleration of the remote controller 200.

The sensor 264 may include a force sensor (not shown) or a pressure sensor (not shown) to detect contact of the user on the surface of the remote controller 200 or user's grip. In addition, the sensor 264 may include a grip sensor (not shown) to detect user's grip on the remote controller 200.

According to an example embodiment, the sensor 264 may detect a motion (or acceleration) of the remote controller 200. In addition, the sensor 264 may detect user's contact on the remote controller 200 or user's grip on the remote controller 200.

The controller 210 may generate a control signal corresponding to a motion of the remote controller 200 and transmit the control signal to the display apparatus 100 through the communication unit 230. In addition, the controller 210 may generate a control signal corresponding to user's contact or user's grip, and transmit the control signal to the display apparatus 100 through the communication unit 230.

The vibration motor (not shown) may convert an electrical signal into a mechanical vibration under the control of the controller 210. For example, the vibration motor (not shown) may include a linear vibration motor, a bar type vibration motor, a coin type vibration motor, or a piezoelectric element vibration motor. A single vibration motor (not shown) or a plurality of vibration motors (not shown) may be disposed inside the remote controller 200. In addition, the vibration motor (not shown) may vibrate the entirety of the remote controller 200 or may vibrate a part of the remote controller 200.

According to an example embodiment, the vibration motor (not shown) may output haptic feedback corresponding to transmission of the control information under the control of the controller 210. The vibration motor (not shown) may provide a variety of haptic feedback (for example, intensities of vibrations and vibration holding times corresponding to various haptic patterns) stored in the storage 280 based on control information transmitted by the controller 210.

For example, the display 270 may include a display of a liquid crystal display (LCD) method, an OLED method, a plasma display panel (PDP) method, or a vacuum fluorescent display (VFD) method, or the like, but is not limited thereto.

The display 270 may display a broadcast channel number, a broadcast channel name, and/or a state of the display apparatus (for example, screen off, a pre-power on mode, and/or a normal mode) which is displayed on the display apparatus 100.

In response to the remote controller 200 and the display apparatus 100 being connected with each other through short-distance communication, the display 270 may display a text reading "BT connected" under the control of the controller 210, for example.

In response to an optical signal being output from the remote controller 200 to the display apparatus 100, the display 270 may display a text, an icon, or a symbol corresponding to "TV ON" for turning on the power of the display apparatus 100, "TV OFF" for turning off the power of the display apparatus 100, "Ch No." for displaying a tuned channel number, or "Vol. Value" for indicating an adjusted volume under the control of the controller 210.

The storage 280 may store various data, programs, or applications for driving and controlling the remote controller 200 under the control of the controller 210. The storage 280 may store signals or data which is input or output according to the driving of the communication unit 230, the light outputter 250, and the power supply 290.

The storage 280 may store control information corresponding to a received user input (for example, a touch, pressing, a touch gesture, a voice, or a motion) and/or control information corresponding to a motion of the remote controller 200 under the control of the controller 210.

The storage 280 may store remote controller information corresponding to the remote controller 200. The remote controller information may include a model name, a unique device ID, remaining memory capacity, presence/absence of object data, a Bluetooth version, or a Bluetooth profile.

The storage 280 may store control information corresponding to selection of the power button 261a (for example, a first user input) transmitted to the display apparatus 100.

The storage 280 may store one or two or more haptic patterns. The haptic pattern may be expressed by a wave form. For example, the haptic pattern may be expressed by vibration time (for example, in the unit of 50 ms) of the vibration motor (not shown) shown on the horizontal axis, and an intensity of vibration (for example, in the unit of 500 mV) of the vibration motor (not shown) shown on the vertical axis. For example, a first haptic pattern may be a vibration which gradually increases from 0V to 800 mV, gradually decreases to 100 mV, and then increases. In addition, an increasing section and a reducing section may be symmetrical to each other.

In response to a plurality of haptic patterns being stored in the storage 280, one of the plurality of haptic patterns may be set as a favorite haptic pattern through setting. In response to the favorite haptic pattern being set, the controller 210 may preferentially provide the favorite haptic pattern through the vibration motor (not shown).

It would be easily understood by a person skilled in the art that the haptic pattern is added, changed, or deleted according to the function or configuration of the remote controller 200.

The power supply 290 may supply power to the elements 210-290 of the remote controller 200 under the control of the controller 210. The power supply 290 may supply power to the elements 210-290 from one or two or more batteries (not shown) disposed in the remote controller 200. The battery may be disposed in the inside of the remote controller 200 between the front surface (for example, a surface on which the button 261 or the touch pad 262 is formed) and the rear surface (not shown) of the remote controller 200.

From among the elements of the remote controller 200 illustrated in FIGS. 1 and 2B, at least one element (for example, at least one of the elements illustrated by dashed boxes) may be added or deleted based on the performance of the remote controller 200. In addition, it would be easily understood by a person skilled in the art that the locations of the elements are changed based on the performance or configuration of the remote controller 200.

Hereinafter, a method for controlling the screen of the display apparatus will be described in greater detail by way of an example with reference to the drawings.

FIG. 3 is a flowchart illustrating an example display control method of the display apparatus according to an example embodiment.

Figure 4:
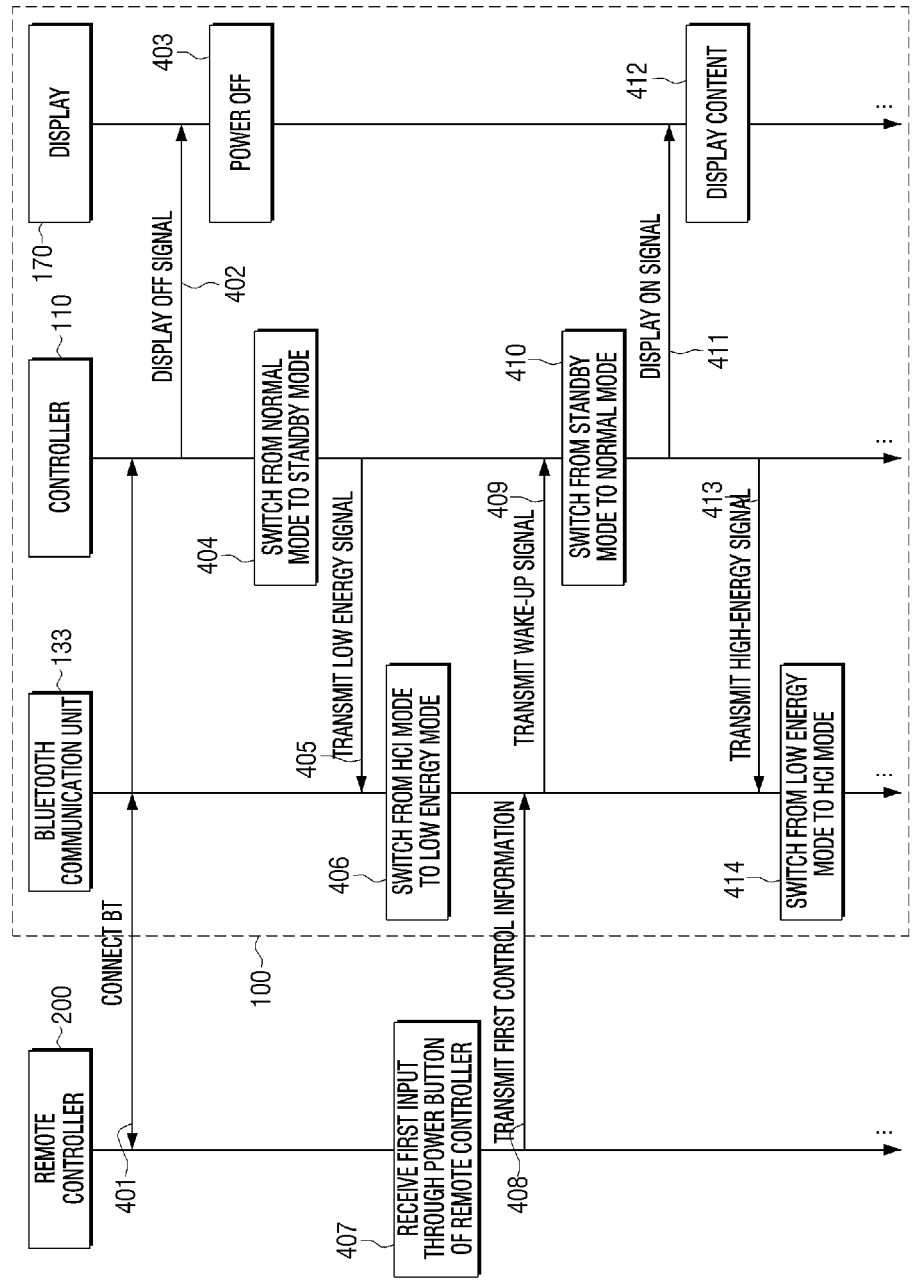
FIG. 4 is a sequence diagram illustrating an example display control method of the display apparatus according to an example embodiment.

FIG. 4 is a sequence diagram illustrating an example display control method of the display apparatus according to an example embodiment.

FIGS. 5A to 5D are diagrams illustrating an example of the display control method of the display apparatus according to an example embodiment.

In step S310 of FIG. 3, the display apparatus switches to the standby mode.

Figure 5A:
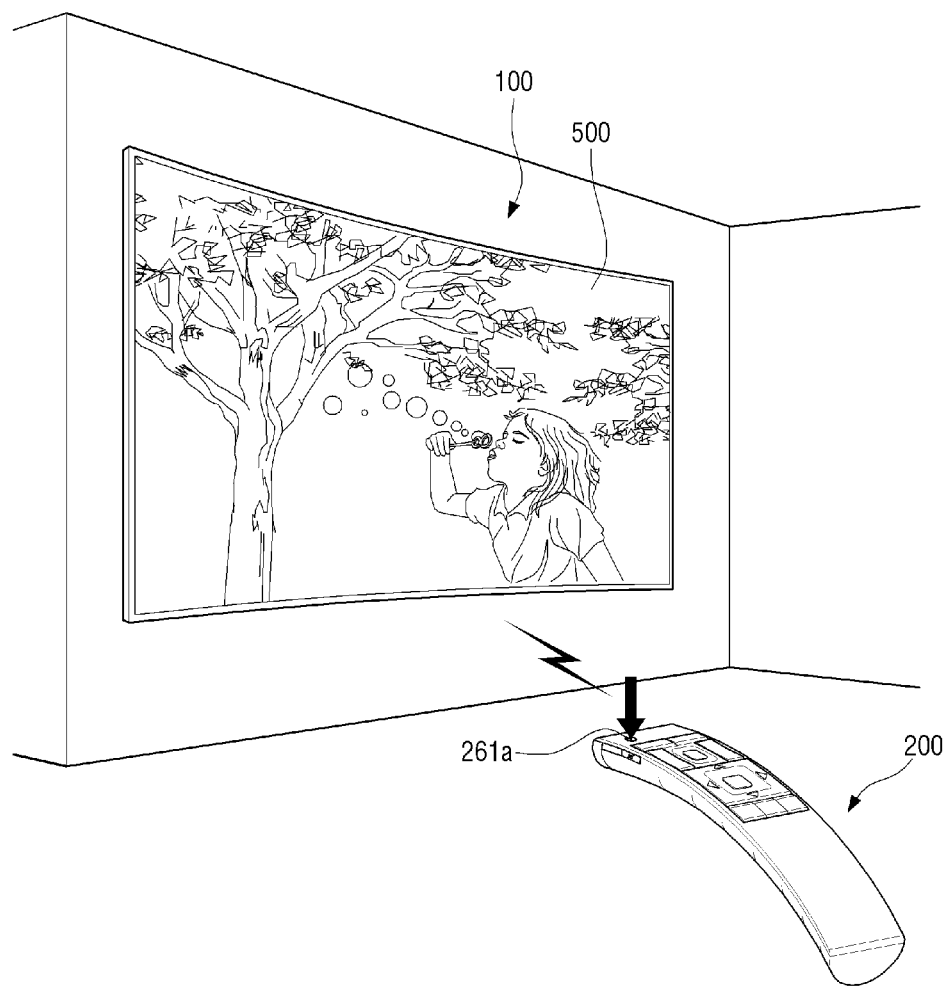
FIGS. 5A, 5B, 5C and 5D are diagrams illustrating an example of the display control method of the display apparatus according to an example embodiment.
Figure 5B:
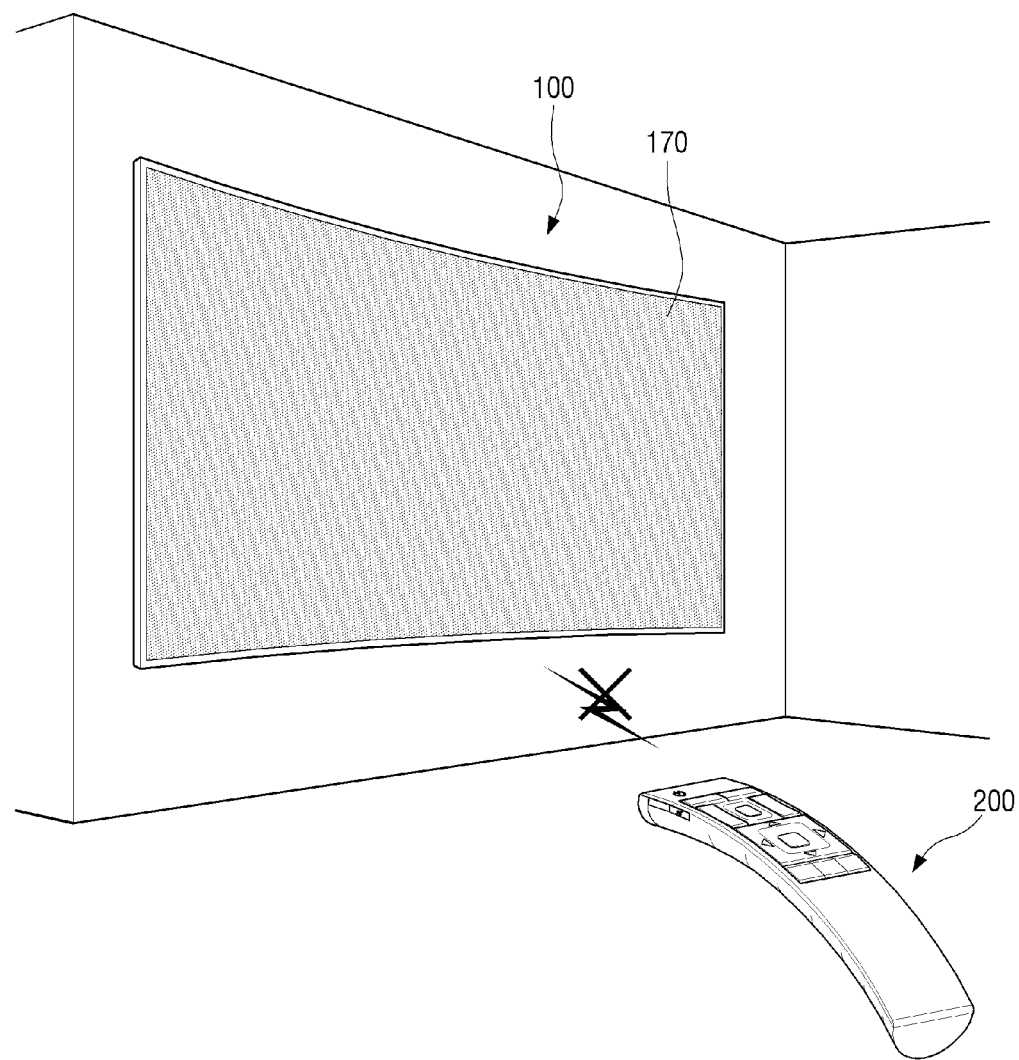

FIG. 5A illustrates a state in which the display apparatus displays a content in the normal mode, and FIG. 5B illustrates a state in which the display apparatus switches to the standby mode and the screen is turned off.

Referring to FIGS. 4, 5A, and 5B, the screen of the display apparatus is turned off based on a control command of the remote controller 200 (401 or 404).

The display apparatus 100 and the remote controller 200 may be connected with each other through Bluetooth communication. It would be easily understood by a person skilled in the art that the display apparatus 100 and the remote controller 200 may be connected with each other through Bluetooth communication (for example, one of the Bluetooth classic method and the Bluetooth low energy method).

The screen of the display apparatus 100 may be turned off by the user. Control information (not shown) corresponding to selection of the power button 261a on the remote controller 200 may be received by the display apparatus 100.

A control signal (not shown) corresponding to selection of a panel key (not shown) of the display apparatus 100 may be received by the controller 110 of the display apparatus 100. The panel key (not shown) may be disposed on the front surface, the side surface, or the rear surface (for example, a surface of a bottom chassis) of the display apparatus 100. The panel key (not shown) may be a physical key or a touch key.

The display apparatus 100 may be connected to an external power outlet through a plug of a power cable.

In response to control information corresponding to the power off of the screen of the display apparatus (or power off of the display apparatus 100) being received by the display apparatus 100, the controller 110 may turn off the display 170 (402). For example, the controller 110 may transmit a content output off signal to the display 170 or may shut off the power supplied to the display 170 or transmit a power off signal to the power supply 190.

The display 170 is turned off under the control of the controller 110 (403).

In response to the control information corresponding to the power off of the screen of the display apparatus 100 being received by the display apparatus 100, the controller 110 may transmit a screen off signal to the display 170 which reproduces a content 500. In response to the screen off signal, the display 170 may stop reproducing the content.

In response to the control information corresponding to the power off of the screen of the display apparatus 100 being received by the display apparatus 100, the controller 110 may control the power supply 190 which supplies power to the display 170 to shut off the power supplied to the display 170.

In response to the control information corresponding to the power off of the screen of the display apparatus 100 being received by the display apparatus 100, power may be supplied to the sub processor (not shown). In addition, in response to the control information corresponding to the power off of the screen of the display apparatus 100 being received by the display apparatus 100, power supplied to the main processor (not shown) may be shut off.

In response to the control information corresponding to the power off of the screen of the display apparatus 100 being received by the display apparatus 100, the display apparatus 100 switches from the normal mode to the standby mode (404).

In response to the control information corresponding to the power off of the screen of the display apparatus 100 being received by the display apparatus 100, power supply may be stopped to most of the inner elements of the display apparatus 100. In addition, in response to the screen of the display apparatus 100 being turned off, power may be continuously supplied to some of the elements.

In response to the screen of the display apparatus 100 being turned off, power may be continuously supplied to the communication unit 130. In addition, in response to the screen of the display apparatus 100 being turned off, the controller 110 (or sub processor) may control to continuously supply power to the Bluetooth communication unit 133.

In response to the screen of the display apparatus 100 being turned off, the first power supply may be controlled by the controller 110 (or sub processor) to continuously supply power to the Bluetooth communication unit 133. The Bluetooth communication unit 133 to which power is supplied may be in an activation state even in the off state of the screen of the display apparatus 100, so that the Bluetooth communication unit 133 can receive Bluetooth packets from the outside.

Referring to FIG. 4, steps (402 to 404) are illustrated in sequence, but it would be easily understood by a person skilled in the art that the order of some steps may be changed (for example, the display may be turned off after the display apparatus switches from the normal mode to the standby mode).

In step S320 of FIG. 3, the Bluetooth communication unit receives a low energy signal of the display apparatus.

As illustrated in FIGS. 4 and 5B, in response to the display apparatus 100 switching from the normal mode to the standby mode, the controller 110 (or the sub processor) may transmit a low energy signal corresponding to the switch to the standby mode to the Bluetooth communication unit 133 (405).

The Bluetooth communication unit 133 may receive the low energy signal from the controller 110 through the HCI. The Bluetooth communication unit 133 may store low energy information corresponding to the low energy signal in the first storage (not shown). The stored low energy information may include a low energy information identifier (ID) or low energy signal reception time for managing history.

In step S330 of FIG. 3, the Bluetooth communication unit 133 switches from the HCI mode to the low energy mode.

As illustrated in FIGS. 4 and 5B, the Bluetooth communication unit 133 switches from the HCI mode to the low energy mode in response to the low energy signal being received (406).

The Bluetooth communication unit 133 switches from the HCI mode to the low energy mode through the switching module in response to the low energy signal being received. The HCI type dual mode Bluetooth processor of the Bluetooth communication unit 133 may switch from the HCI mode to the low energy mode.

The HCI type dual mode Bluetooth processor which switches to the low energy mode may receive Bluetooth packets from the outside in the same way as in the HCI mode. In addition, the HCI type dual mode Bluetooth processor which switches to the low energy mode may receive Bluetooth packets from the outside in the same way as in the HCI mode unlike an existing HCI type dual mode Bluetooth processor.

The HCI type dual mode Bluetooth processor may store low energy mode change information in the first storage (not shown) in response to the switch to the low energy mode. The stored low energy mode change information may include a low energy mode change information identifier (ID) or low energy mode change time for managing history.

In step S340 of FIG. 3, first control information corresponding to a first input detected in the remote controller 200 is received.

Figure 5C:
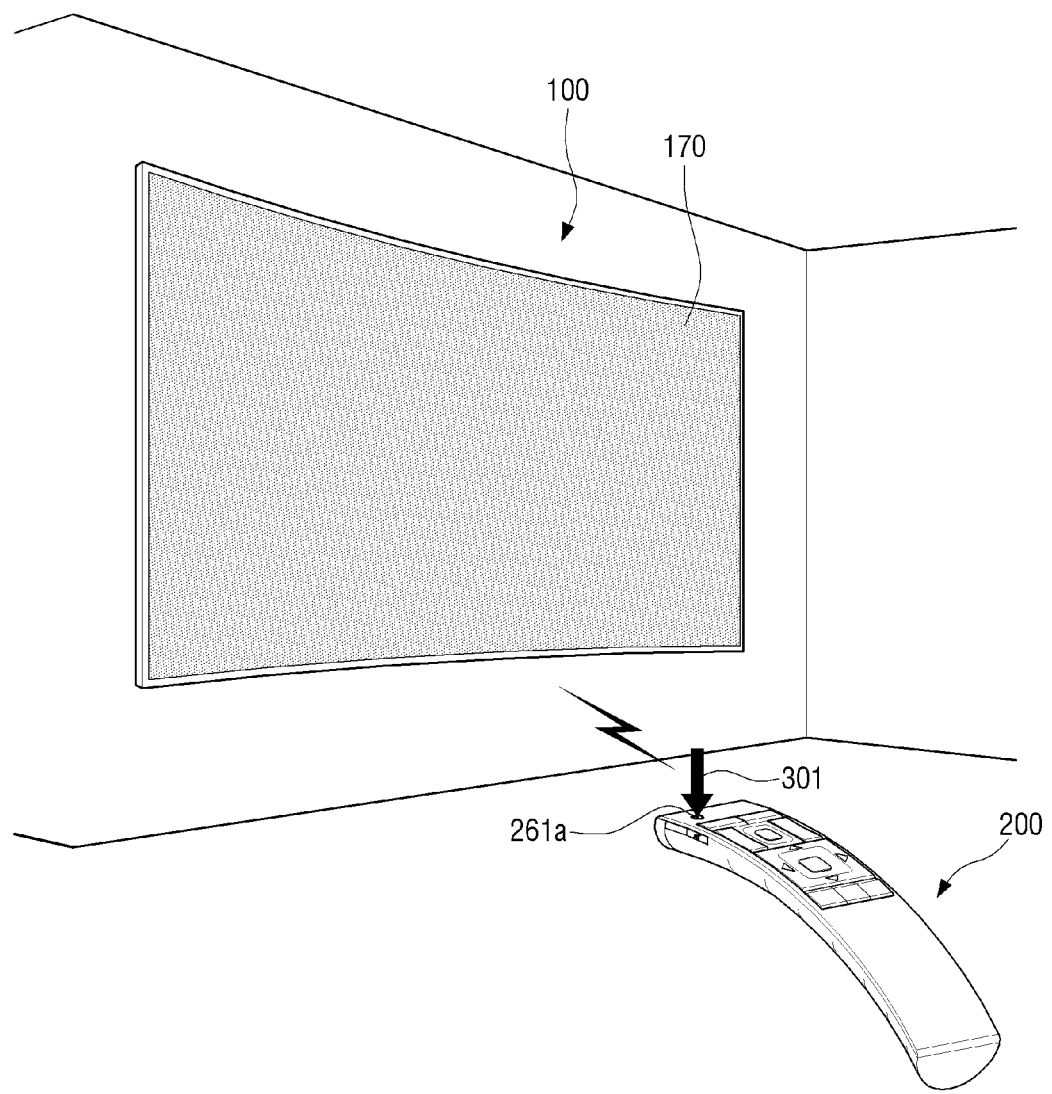

Referring to FIGS. 4 and 5C, the first input (e.g., a user input) is received at the power button of the remote controller 200 (407).

The user selects the power button 261a of the remote controller 200. According to an example embodiment, this operation may be, for example, referred to as a first user input 301. The first user input 301 on the power button 261a (or selection of the power button 261a) may include pressing the power button 261a, touching the power button 261a, and/or a touch gesture on the power button 261a. In addition, the selection of the power button 261a may include a user's voice (for example, corresponding to a command saying "Power on") which is input through the microphone 263 or a user's gesture (for example, a gesture of drawing a circle while gripping the remote controller 200) which is detected through the sensor 264.

The controller 210 of the remote controller 200 may store power button selection information corresponding to the selection of the power button 261a in the storage 280. The stored power button selection information may include a power button selection information identifier (ID) or power button selection time for managing history.

The controller 210 may generate first control information to be transmitted to the display apparatus 100 using the stored power button selection information. The controller 210 may load the first control information stored in the storage 280 or select the first control information from among a plurality of pieces of control information in response to the first user input 301 being detected. The first control information may be control information for displaying the content 510 (for example, a broadcast channel or a video) on the screen of the display apparatus 100.

Figure 6:
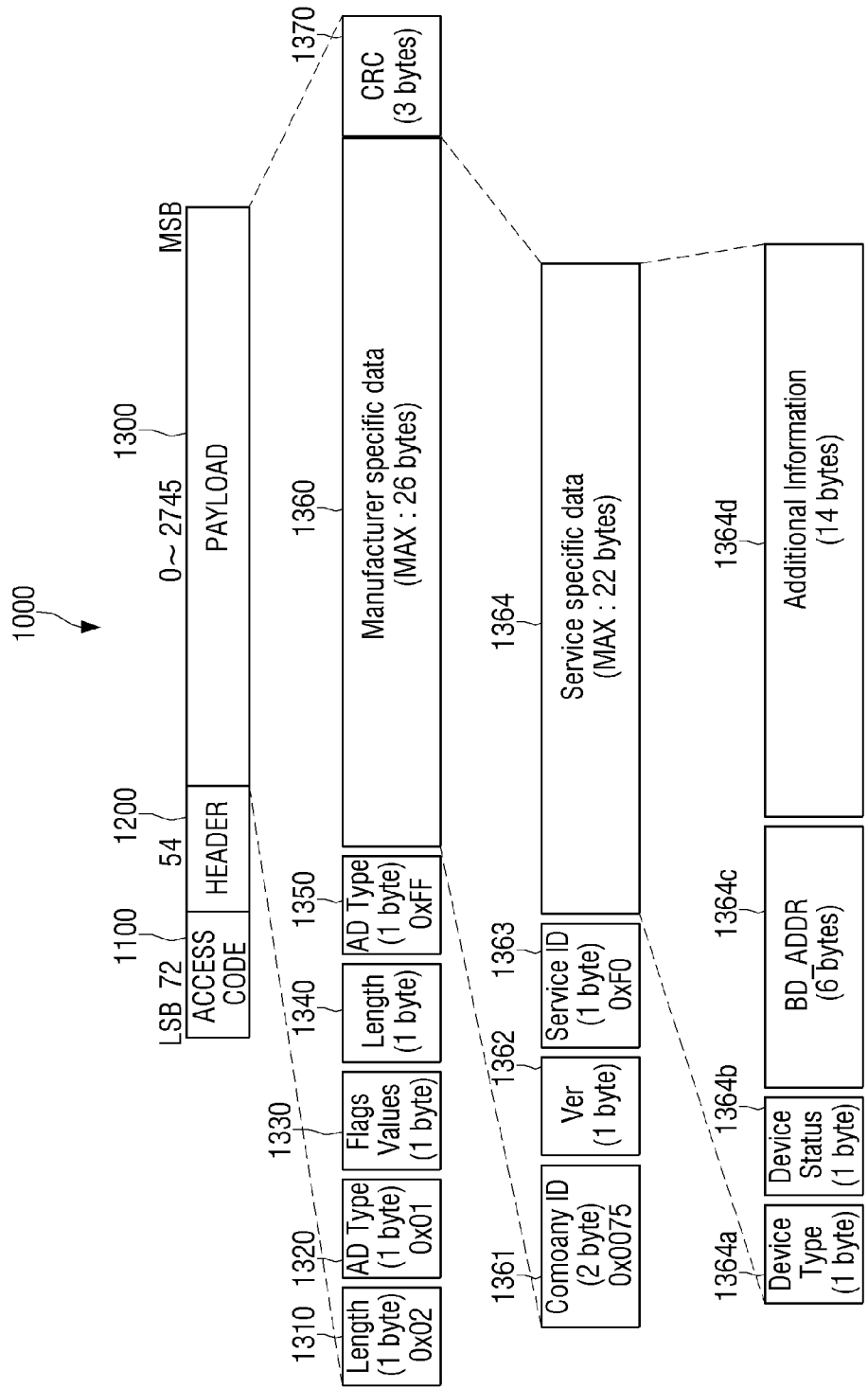
FIG. 6 is a diagram illustrating an example Bluetooth packet format according to an example embodiment.

FIG. 6 is a diagram illustrating an example Bluetooth packet format according to an example embodiment.

Referring to FIGS. 4 and 5C, the controller 210 transmits the first control information to the display apparatus 100 (408).

The controller 210 may transmit the first control information to the display apparatus 100 through the communication unit 230. The controller 210 may transmit the first control information to the display apparatus 100 using a Bluetooth packet through the short-distance communication unit 232.

The Bluetooth packet may include a Bluetooth classic packet or a Bluetooth low energy packet.

In response to the first control information being the Bluetooth low energy packet, the controller 210 of the remote controller 200 may transmit the first control information to the display apparatus 100 in the form of the Bluetooth packet (1000 of FIG. 6).

The Bluetooth packet 1000 includes, for example, an access code 1100 (72 bits) for determining the effectiveness of the packet, a header 1200 (54 bits), and a payload 1300 (0-2745 bits). The access code 1100 is used to determine the effectiveness of the packet. The header 1200 includes a Media Access Control (MAC) address and a packet type. The payload may include data to be transmitted and has a size changed according to the type of a packet to be transmitted. The first control information to be transmitted to the display apparatus 100 may be included in the payload 1300 of the packet.

The payload 1300 may include a payload length 1310, an advertising data type 1320, flags values 1330, an advertising data length 1340, an advertising data type 1350, and manufacturer specific data 1360. An entirety or part of the first control information may be included in the manufacturer specific data 1360. The payload 1300 may also include CRC data 1370.

The manufacturer specific data 1360 may include a company identifier (ID) 1361, a version 1362, a service ID 1363, and service specific data 1364. An entirety or part of the first control information may be included in the service specific data 1364.

The service specific data 1364 may include a device type 1364a, a device status 1364b, a Bluetooth device address 1364c, and additional information 1364d.

The controller 210 may periodically transmit the first control information to the display apparatus 100 through the short-distance communication unit 232.

The Bluetooth communication unit 133 of the display apparatus 100 the screen of which is turned off receives the Bluetooth packet including the first control information transmitted from the remote controller 200. The received first control information may be stored in the first storage under the control of the HCI type dual mode Bluetooth processor of the Bluetooth communication unit 133.

In step S350 of FIG. 3, a "wake-up" signal is transmitted from the Bluetooth communication unit 133 to the sub processor of the display apparatus 100.

Referring to FIGS. 4 and 5C, the "wake-up" signal is transmitted from the Bluetooth communication unit 133 to the sub processor of the display apparatus 100 (409).

The HCI type dual mode Bluetooth processor may analyze the received first control information. The HCI type dual mode Bluetooth processor may analyze the Bluetooth packet corresponding to the received first control information. The HCI type dual mode Bluetooth processor may transmit a wake-up signal to wake up the display apparatus 100 to the sub processor according to the result of the analysis.

In response to the first control information being received, the HCI type dual mode Bluetooth processor may not analyze the first control information and may directly transmit the wake-up signal to the sub processor. After transmitting the wake-up signal to the sub processor, the HCI type dual mode Bluetooth processor may analyze the received first control information.

In response to the wake-up signal being transmitted from the Bluetooth communication unit 133 to the sub processor, the display apparatus 100 may be in the standby mode in which the screen is turned off.

In step S360 of FIG. 3, a content is displayed on the display of the display apparatus 100.

Figure 5D:
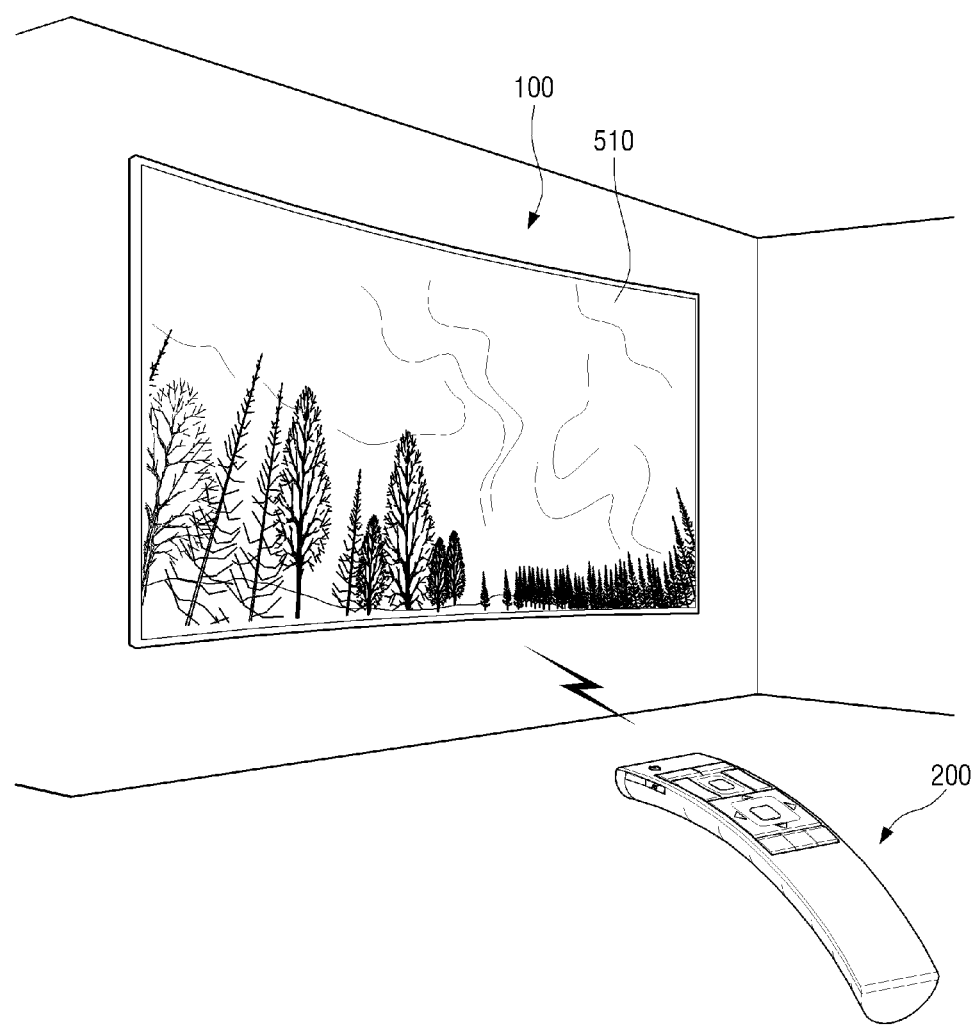

Referring to FIGS. 4 and 5D, the display apparatus 100 may switch from the standby mode to the normal mode (410).

In response to the wake-up signal being received from the Bluetooth communication unit 133, the sub processor may wake up the main processor. The sub processor may control the power supply 190 to supply power to the main processor.

In response to the main processor being woken up, the display apparatus 100 may switched from the standby mode to the normal mode. The controller 110 may control the power supply 190 to supply power to all of the inner elements 110 to 190 of the display apparatus 100. The controller 110 may control the power supply 190 to supply power to the inner elements 110 to 190 of the display apparatus 100 except for some elements (for example, the audio outputter). In addition, the controller 110 may control the power supply 190 to supply power to the inner elements 110-190 of the display apparatus 100 in sequence.

In response to the display apparatus 100 switching from the standby mode to the normal mode, the controller 110 may output an "on" signal to the display 170 (411).

The display 170 may be turned on under the control of the controller 110 (412).

FIG. 5D illustrates a state in which the display apparatus 100 switches to the normal mode, turns on the display, and displays a content.

In response to the display apparatus 100 switching from the standby mode to the normal mode, the controller 110 may transmit a screen on signal to the display 170 which reproduces a content. In response to the screen on signal, the display 170 may start reproducing the content.

In response to the display apparatus 100 switching from the standby mode to the normal mode, the controller 110 may control the power supply 190 to supply power to the display 170.

The display 170 to which power is supplied displays the content 510 (for example, a broadcast channel or a video). The content displayed on the display apparatus 100 may include a video which is reproduced through an application installed in the display apparatus 100, an image which is displayed through an application, or a web page which is displayed through a web browser, in addition to a broadcast channel.

The controller 110 may provide visual feedback such as an animation effect in response to the content being displayed on the display apparatus 100. In addition, the controller 110 may provide auditory feedback through the audio outputter 175 in response to the content being displayed on the display apparatus 100.

Referring to FIGS. 4 and 5D, the controller 110 may transmit a high energy signal to the Bluetooth communication unit 133 (413).

In response to the display apparatus 100 switching from the standby mode to the normal mode, the controller 110 may transmit the high energy signal corresponding to the switch to the normal mode to the Bluetooth communication unit 133. The Bluetooth communication unit 133 may receive the high energy signal from the controller 110 through the HCI. The Bluetooth communication unit 133 may store high energy information corresponding to the received high energy signal in the first storage (not shown). The stored high energy information may include a high energy information ID or high energy signal reception time for managing history.

Referring to FIGS. 4 and 5D, the Bluetooth communication unit 133 switches from the low energy mode to the HCI mode in response to the high energy signal being received (414).

In response to the high energy signal being received, the Bluetooth communication unit 133 switches from the low energy mode to the HCI mode through the switching module. The HCI type dual mode Bluetooth processor of the Bluetooth communication unit 133 may switch from the low energy mode to the HCI mode.

The HCI type dual mode Bluetooth processor may store HCI mode change information in the first storage (not shown) in response to the HCI mode. The stored HCI mode change information may include an HCI mode change information ID or HCI mode change time for managing history.

The above-described control of the display apparatus may be repeatedly performed.

In step S360 of FIG. 3, in response to the content being displayed on the display apparatus 100, the control method of the display apparatus is finished.

In the above-described example embodiments, the display apparatus 100 and the remote controller 200 have been mainly described, but the above-described example embodiments may be applied to various kinds of electronic devices. For example, the above-described example embodiments may be applied to only a source device including an HCI type dual mode Bluetooth processor, or between a source device including an HCI type dual mode Bluetooth processor and external devices.

The methods according to example embodiments may be implemented in the form of program commands which are performed through various computers, and may be recorded on a computer-readable medium. The computer-readable medium may include program commands, data files, and data structures either alone or in combination. For example, the computer readable medium may be stored in a volatile or non-volatile storage device such as a ROM, a memory such as a RAM, a memory chip, a device, or an integrated circuit, or a storage medium which can optically or magnetically record and simultaneously can be read by a machine (for example, a computer), such as a CD, a DVD, a magnetic disk, or a magnetic tape, regardless of whether the compute readable medium can delete or re-record data or not.

A memory which may be included in a mobile terminal may be an example of a program including instructions for implementing example embodiments of the present disclosure or a storage medium which is suitable for storing programs and can be read by a machine. Program commands recorded on the medium are specially designed and configured for the present disclosure or may be well known to a person skilled in the field of computer software and may be used.

While the disclosure has been illustrated and described with reference to certain example embodiments thereof, it will be understood by those skilled in the art that various changes in form and details may be made therein without departing from the spirit and scope of the disclosure as defined by the appended claims.

Therefore, the scope of the disclosure is defined not by the detailed description but by the appended claims, and all differences within the scope will be construed as being included in the disclosure.

What is claimed is:

1. A display apparatus comprising:
   a display;
   Bluetooth communication circuitry comprising a processor; and
   a controller configured to control the display and the Bluetooth communication circuitry,
   wherein, in a normal mode in which the display is turned on, the controller is configured to control the Bluetooth communication circuitry to operate in a Host Controller Interface (HCI) mode and control a Bluetooth stack to interwork with the processor through HCI, and
   wherein, in a standby mode in which the display is turned off, the controller is configured to control the Bluetooth communication circuitry to operate in a low power mode.

2. The display apparatus of claim 1, further comprising a power supply,
   wherein the controller is configured to control the power supply to supply power to the Bluetooth communication circuitry in the standby mode.

3. The display apparatus of claim 1, wherein the Bluetooth communication circuitry is configured to operate as one of an HCI mode profile and a low power mode profile based on a mode of the display apparatus.

4. The display apparatus of claim 1, wherein, in the low power mode, the Bluetooth communication circuitry is configured to operate independently from the controller.

5. The display apparatus of claim 1, wherein the controller comprises a main processor and a sub processor, and
   wherein the Bluetooth communication circuitry is configured to communicate with the sub processor of the controller in the low power mode.

6. The display apparatus of claim 5, wherein the Bluetooth communication circuitry is configured to receive control information from a remote controller in the low power mode.

7. The display apparatus of claim 6, wherein the Bluetooth communication circuitry is configured to transmit a wake-up signal to the sub processor of the controller corresponding to the reception of the control information.

8. The display apparatus of claim 7, wherein the controller is configured to control the display apparatus to switch to the normal mode in response to the wake-up signal.

9. The display apparatus of claim 8, wherein the controller is configured to control the display apparatus to reproduce a content on the display in response to the switch to the normal mode.

10. A method of controlling a display apparatus which selectively operates in one of a Host Controller Interface (HCI) mode and a low power mode, the method comprising:
    controlling Bluetooth communication circuitry of the display apparatus to operate in the HCI mode and a Bluetooth stack to interwork with a processor of the Bluetooth communication circuitry through HCI when the display apparatus is in a normal mode in which a display of the display apparatus is turned on;
    controlling the Bluetooth communication circuitry to operate in the low power mode when the display apparatus is in a standby mode in which the display is turned off; and
    switching the display apparatus from the standby mode to the normal mode in response to control information being received by the Bluetooth communication circuitry from a remote controller.

11. The method of claim 10, wherein the operating in the HCI mode comprises interworking, by the Bluetooth communication circuitry, with a main processor of the display apparatus.

12. The method of claim 10, wherein the operating in the low power mode comprises communicating, by the Bluetooth communication circuitry, with a sub processor of the display apparatus, and operating a Bluetooth processor of the Bluetooth communication circuitry independently from a Bluetooth stack of the display.

13. The method of claim 10, wherein the switching to the HCI mode comprises transmitting, by the Bluetooth communication circuitry, a wake-up signal to a sub processor of the display apparatus in response to the control information being received.

14. The method of claim 10, wherein the control information comprises one of a BLE packet which follows a Bluetooth low energy standard, and a Bluetooth classic packet which follows a Bluetooth classic standard.

15. The method of claim 10, further comprising outputting feedback to the display.

\* \* \* \* \*